Feb. 24, 1942.   A. O. WILLIAMS   2,274,228
ARTICULATED CAR CONSTRUCTION
Filed Nov. 1, 1939   2 Sheets-Sheet 1

INVENTOR:
Alfred O. Williams.
BY Walter E. Schirmer
ATTORNEY.

Patented Feb. 24, 1942

2,274,228

UNITED STATES PATENT OFFICE 2,274,228

ARTICULATED CAR CONSTRUCTION

Alfred O. Williams, Battle Creek, Mich., assignor to Clark Equipment Company, Buchanan, Mich., a corporation of Michigan Application November 1, 1939, Serial No. 302,279

14 Claims. (Cl. 105—4)

This invention relates to articulated car constructions, and more particularly is concerned with the articulation of vehicle cars, car sections, or the like, for use in rapid transit urban transportation, as well as for use in streamlined passenger trains and all types of surface, elevated or subway multi-car vehicle transportation systems.

One of the primary objects of the present invention is to simplify the articulation of two car ends for mounting upon a single rail truck, this articulation being so constructed and arranged as to insure ready assembly and disassembly of the car sections when uncoupling of the car units is desired, while at the same time providing a rigid compact structure which is supported to sustain the loads required and to provide a fully enclosed and weather-protected passageway between the adjacent cars.

One of the primary features of the present invention is to provide a connecting floor plate between the cars which is supported about a major portion of its periphery at a level corresponding to the floor level of the car and which is so arranged to prevent vibration or rattling while the train is in motion.

Another feature of the present invention is to provide an articulation of the adjacent car ends upon a car truck in such manner that no lateral or side support for one of the cars is necessary, it being held rigidly against lateral rocking movement by the mounting in the king pin of the truck with the second car body being swivelled for movement upon the first car body and having means for preventing lateral rocking, which, at the same time, serves to provide for positioning and support of the floor plate intermediate the cars.

Still another feature of the invention is the provision of suitable arcuate shrouding defining the side walls of the car passageway which is expansible and contractible as the cars round curves or the like to maintain the weatherproofing of the passageway for the comfort of the passengers.

Still another feature provided by the present invention is the provision of a roof or top plate covering the passageway which seals the upper end thereof against the entrance of moisture or the like, and which is so held as to prevent any possibility of rattling or vibration thereof during the movement of the vehicle.

These and other more specific objects of the present invention will be more apparent from the following detailed description which, taken in conjunction with the accompanying drawings, will disclose to those skilled in the art the particular construction and operation of a preferred form of the present invention.

In the drawings:

Figure 4 is a plan view showing the support of the floor plate between the cars.

Figure 1:
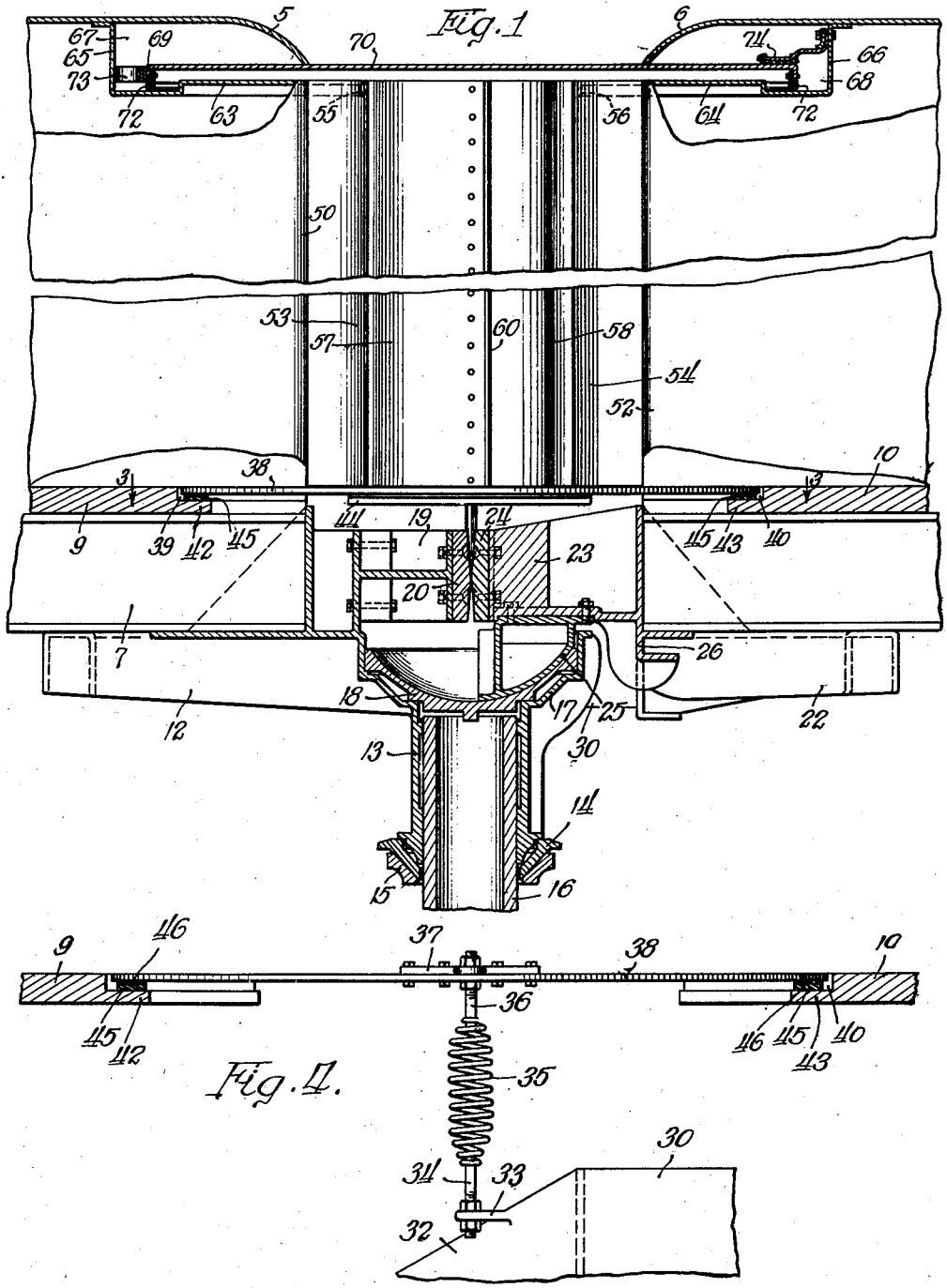
Figure 1 is a vertical sectional view with portions broken away of the articulated construction.

Referring now in detail to the drawings, two car bodies are indicated generally at 5 and 6. Each of these car bodies is provided with a lower frame including the longitudinally extending sills or end frame members 7 and 8, respectively, upon which is supported the floors 9 and 10 of the cars. The end frame member 7 of the car body 5 has secured at the end thereof a casting member 12 provided with a downwardly extending pedestal portion 13 supported at its lower end by a thrust bearing assembly 14 carried in a suitable bolster member 15 of a car truck, and is centered about a vertically extending king pin member 16 carried by the truck.

Above the pedestal portion 13 the member 12 is provided with a substantially semi-spherical socket portion 17 having disposed therein the concave spherical bearing member 18 which preferably is formed of bronze or similar bearing material.

Secured to the member 12 above the bearing 18 is a bumper bracket 19 to which is secured the face plate 20 which is of arcuate form and lies in a horizontal plane adjacent the intersection of the two cars.

The car body 6 has an end frame casting 22 carried at the end thereof, which casting has the longitudinally extending projection 23 to which is secured a similar bumper member 24 adapted to lie in juxtaposition to the member 22, whereby the two car bodies are disposed in longitudinal abutting engagement. Secured to the under face of the projecting portion 23 of the member 22 is a depending bearing member 25 having a spherical portion adapted to seat in the semi-spherical bearing 18 and to rotate therein when the cars round curves in the track along which they are moving. The bearing member 25 engages only approximately half of the semi-spherical bearing 18 at any time, but can move thereabout on an axis passing through the center of the king pin 16 and the bearing member 18 to occupy various angular positions, depending upon the angle between the longitudinal center lines of the cars.

Preferably, the member 22 is provided with an arcuate channel portion 26 which is adapted to receive a chain or other coupling member carried by the member 12 for holding the two cars against relative longitudinal displacement should any portion of the bearing assembly break down. This is merely a safety means for insuring that the two cars will remain in coupled engagement.

Secured to the end frame member 22 at opposite sides of the longitudinal center of the car body 6 are bracket supports 30 which provide for lateral support of the car body 6 to limit its rocking about a longitudinal center and also have extending portions 32 which project past the center line between the two car bodies, and are provided with lug portions 33 adapted to receive bolt members 34 secured in vertical position therein. The bolt members 34 each have a headed end about which the lower end of a coil spring 35 is engaged. The opposite end of the coil spring 35 is engaged about the head end of a corresponding bolt member 36 secured by means of the bracket plate 37 to the lateral edge of a common plate 38 which extends through the vestibule between the car bodies, and forms a continuation of the floors 9 and 10. The plate 38 is circular in form and the end floor portions of the floors 9 and 10 are provided with arcuate recesses 39 and 40, respectively, having extending lip portions 42 and 43 serving as arcuate supports for the periphery of the plate to support the same upon the two car bodies. The plate 38 is preferably provided with stiffening flanges 44 to prevent its buckling under the weight of passengers passing from one car to the other, and also is preferably provided with rubber cushioning supporting members 45 vulcanized to plates 46 secured to the under side of the floor plate 38 in circumferentially spaced relation, whereby the plate 38 is resiliently cushioned on the end frames of the car bodies to prevent rattling thereof. It will be noted that the provision of the connections from the brackets 37 to the brackets 30 through the springs 35 allow the floor plate to rotate as the car bodies swing into angular position when rounding a curve or the like so as to maintain the floor plate in position regardless of the angularity between the longitudinal centers of the car bodies. Thus the plate 38 is resiliently supported against vertical movement, and is also resiliently supported for slight rotative movement, depending upon the angularity between the car bodies. The springs 35 allow a slight amount of this rotative movement but restrain the plate against vertical movement, maintaining it tensioned downwardly against the cushions 45. The springs 35 thus can be flexed laterally as the cars move into angular relationship, but at the same time always exerts a downward pressure holding the plate in planar alinement with the floors 9 and 10.

Figure 2:
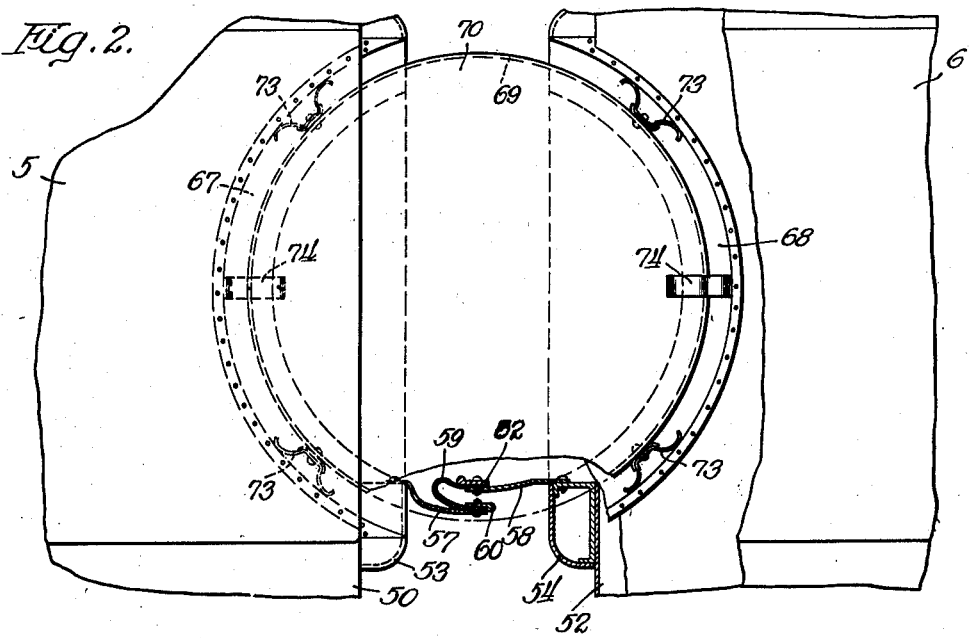
Figure 2 is a top plan view of the roof plate mounting with parts broken away to show certain details.
Figure 3:
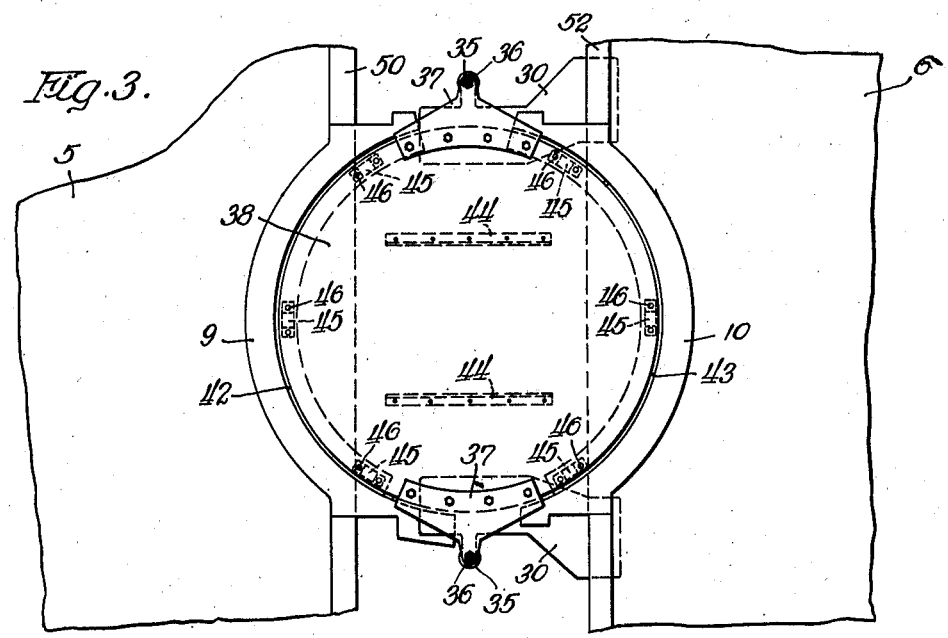
Figure 3 is a section substantially along line 3—3 of Figure 1 showing the floor plate mounting and side wall construction.

As shown more clearly in Figures 1 to 3, the end walls 50 and 52 of the car bodies 5 and 6 are provided adjacent the vestibule openings with vertically extending door frame members 53 and 54 which define the door openings of the car bodies and terminate at their upper ends in transverse headers 55 and 56. These headers, the door frame posts 53 and 54, and the floor plate 38 therefore define a vertically extending rectangular door opening into each of the car bodies.

To enclose the vestibule between the car bodies against weather and to protect the passengers in passing between the cars, the inner faces of the door posts 53 and 54 are provided with arcuate plate members 57 and 58, respectively, which plate members extend past the transverse plane between the cars in overlapping relationship. In order to provide an enclosure that will be sufficiently flexible to insure complete closing of the vestibule even when the car is moving in angular relationship, a vertically extending strip of canvas 59 is provided which is secured along its opposite edges to the overlapping edges of the plates 57 and 58. The canvas 59 is locked in position by means of clamp plates 60 and 62 which securely bind the edges to the corresponding edges of the plates 57 and 58 in tight weatherproof relationship. As the cars move into angular relationship, the canvas 59 is flexed to maintain a sealed closure regardless of the relative movement of the plates 57 and 58.

At the upper end of the door openings in the car bodies, the transverse headers 55 and 56 are provided with transverse horizontally extending head plates 63 and 64, respectively, which cooperate with the vertically extending arcuate flanges 65 and 66, respectively, to form arcuate recesses 67 and 68 in the roof portions at the adjacent ends of the car bodies. Forming a closure at the top of the vestibule opening is a transverse circular plate 70 which has a peripheral normally extending flange 69 terminating at its edge in a weatherproof sealing strip 72 which engages the recessed portions of the plates 63 and 64 to provide sealing engagement therewith for sealing the top of the vestibule opening. The plate 70 is maintained in position against lateral shifting by means of a plurality of spring members 73 which engage the vertical surfaces 65 and 66 of the roof recesses to prevent lateral shifting of the plate 70 relative to either of the cars. The plate 70 is maintained against vertical movement with the sealing strip 72 compressed into sealing engagement with the header plates by means of projecting spring members 74 carried on the vertical flanges 65 and 66 and provided with cushioning material on the under surfaces thereof, pressing downwardly against the upper surface of the plate 70. This maintains the plate against vertical movement to provide for proper engagement of the sealing strip 72, but at the same time is sufficiently resilient so that the car body may move angularly about the plate 70, the plate either moving with the car body and rotating with respect to the adjacent car, or remaining in position while the car body rotates relatively thereto.

It will thus be apparent that with this upper closure plate 70 the upper portion of the vestibule opening is completely sealed from the weather, and any moisture which might find its way into the recesses 67 and 68 about the outer edges of the flange 69 of the plate 70 is drained off without being allowed to pass into the vestibule opening. Similarly, the lateral portions of the vestibule opening are sealed by the provision of the plates 57 and 58 with the flexible canvas strip therebetween which accommodates relative angular movement of the cars while maintaining the side walls of the vestibule opening completely closed against the weather. The floor portion of the vestibule opening is completely closed by the plate 38 which is supported upon the floors of each of the car bodies, it being understood that the plates 57 and 58 and the canvas strips 59 are provided at their lower edges with suitable flexible sealing means engaging the surface of the floor plate 38 to protect the same against the weather. Thus, a completely closed vestibule opening is provided which is sealed both laterally and at the top and bottom against the weather. This opening is so arranged that the floor portion thereof has common support upon the car bodies, as also has the roof plate. Due to the close coupled connection of the two car bodies with respect to the king pin 16 preventing any relative longitudinal displacement therebetween, this sealing engagement can be effectively maintained.

It is therefore apparent that I have provided an articulated car construction in which the vestibule opening is sealed, and is jointly arranged upon both of the car bodies so that the support of the weight of the passengers when crossing from one car to the other is shared by the frame portions of each of the car bodies.

I am aware that various changes may be made in certain details of the construction herein shown and described, and I therefore do not intend to be limited except as defined by the scope and spirit of the appended claims.

I claim:

1. In an articulated car, a truck, two car bodies having adjacent ends carried by the truck and each including end floors and door posts set apart to define a doorway, arcuate ledges formed in each car floor at said doorways, a floor plate having peripheral non-metallic cushioning means on the side thereof supporting the plate on said ledges to extend between said car bodies, spring means biased between said plate and the end of one of said car bodies tending to hold said plate down on said ledges.

2. A vestibule passageway extending between adjacent car body ends of articulated construction, comprising a floor plate resiliently cushioned for support on both said body ends and adapted to have slight relative rotational movement with respect thereto, vertical posts defining doorways in the car ends, vertically extending laterally spaced enclosing sidewalls for said passageway supported on the posts, and a roof plate enclosing the upper edges of said sidewalls and resiliently held in sealing engagement with the adjacent roof ends of the car bodies.

3. An articulated car comprising a truck, two car bodies having adjacent ends carried by the truck, a floor plate between said ends and jointly supported thereby, a passageway extending between adjacent ends of the car bodies and including vertically extending posts defining doorways in the car ends, means forming laterally spaced enclosing side walls for said passageway above said plate and jointly supported at the ends thereof by said posts, and a roof plate supported on each car end above said side walls and resiliently urged into sealing engagement with the car roofs.

4. In an articulated car, a truck, two car bodies having adjacent ends carried by said truck and each having end frame members and door posts set apart to define a doorway, a car floor leading to each doorway and having an arcuate ledge at the doorway, a circular floor plate having peripheral support on the ledges of said doorways and extending therebetween, brackets secured to the edges of said plate intermediate its supports, and means carried by one of said car body end frame members resiliently connected to said brackets for normally holding said plate down on said ledges.

5. The construction of claim 4 further characterized in the provision of resilient non-metallic cushioning means between said plate and said ledge support.

6. In an articulated car, a truck, two car bodies having adjacent ends carried by said truck and each having end frame members and door posts set apart to define a doorway, a car floor leading to each doorway and having an arcuate ledge at the doorway, a circular floor plate having peripheral support on the ledges of said doorways and extending therebetween, extensible lateral spaced apart side walls extending vertically from said floor plate and supported on said door posts to form a vestibule passageway, a circular roof plate, ledge means supporting said roof plate on said adjacent car ends above said side walls and providing free relative rotation therebetween, and spring means carried by the ends of said car bodies pressing said roof plate downwardly on said ledge means, said roof plate having non-metallic means sealing the same on said car end ledge means.

7. In an articulated car, a truck, two car bodies having adjacent ends carried by said truck and each having end frame members and door posts set apart to define a doorway, a car floor leading to each doorway and having an arcuate ledge at the doorway, a circular floor plate having peripheral support on the ledges of said doorways and extending therebetween, extensible lateral side walls extending vertically from said floor plate and supported on said door posts, a roof plate supported on said adjacent car ends above said side walls and laterally overhanging the same, resilient means holding said roof plate against vertical and lateral shifting movement, and resilient means carried by one car body for holding said floor plate down on said ledges while providing limited relative rotation of said plate with respect to each car body.

8. In combination, a pair of car bodies having adjacent ends carried on a common truck king pin, doorways formed in said ends by laterally spaced door posts, a floor plate extending between said doorways and supported on the end of each car, laterally spaced side walls extending vertically from said plate and supported on the vertical defining surfaces of said posts, and a roof plate extending between the roofs of said car ends over said side walls and resiliently maintained against lateral or vertical movement.

9. In combination, a pair of car bodies having adjacent ends carried on a common truck king pin, laterally spaced door posts forming doorways in said ends, a floor plate extending between said doorways and supported on the end of each car, a passageway extending between said doorways and including laterally spaced side walls extending vertically from said plate and supported on the vertical defining surfaces of said door posts, and a detachable roof plate adapted to be jointly supported on said car ends above said side walls and resiliently held against shifting relative to said ends.

10. In combination, a pair of car bodies having adjacent ends carried on a common truck king pin, laterally spaced door posts forming doorways in said ends, a floor plate extending between said doorways and supported on the end of each car, a passageway between said doorways including laterally spaced side walls extending vertically from said plate and supported at the ends thereof on the door posts of the respective car bodies; and spring means carried by the end of one car body holding said floor plate down on its support but permitting limited relative rotation thereof with respect to said car ends.

11. A floor plate mounting for an articulated train construction in which each car frame has a floor terminating at adjacent car ends in depressed arcuate ledges, a circular floor plate having peripherally spaced cushioning means on the periphery of the undersurface thereof resting on said ledges, brackets secured to diametrically opposite edges of said plate intermediate said car frames, means projecting from each car frame under one of said brackets, and universally mounted spring means between said brackets and frame projecting means resiliently holding said plate on said ledges but permitting relative rotation therebetween.

12. A roof plate construction for closing over the vestibule passageway extending between adjacent articulated car bodies, comprising arcuate channel-shaped recesses in the adjacent roof ends of the car bodies, a circular roof plate having a depending peripheral flange extending into said recesses, sealing means between said flange and said recesses, and resilient means between said flange and the outer defining walls of said recesses centering said plate in said recesses but permitting relative rotation of said plate with respect to said recess.

13. A roof plate construction for closing over the vestibule passageway extending between adjacent articulated car bodies, comprising arcuate channel-shaped recesses in the adjacent roof ends of the car bodies, a circular roof plate having a depending peripheral flange extending into said recesses, sealing means between said flange and said recesses, and resilient means carried by the car bodies engaging the upper surface of said plate and urging the plate downwardly into said recesses.

14. A roof plate construction for closing over the vestibule passageway extending between adjacent articulated car bodies, comprising arcuate channel-shaped recesses in the adjacent roof ends of the car bodies, a circular roof plate having a depending peripheral flange extending into said recesses, sealing means between said flange and said recesses, and resilient means carried by the car bodies engaging the upper surface of said plate and urging the plate downwardly into said recesses, said resilient means accommodating relative rotation of said plate with respect to said roof ends.

ALFRED O. WILLIAMS.